Dec. 23, 1958
M. WEISS
2,866,016
SIGNAL COMPARATOR
Filed Sept. 16, 1955
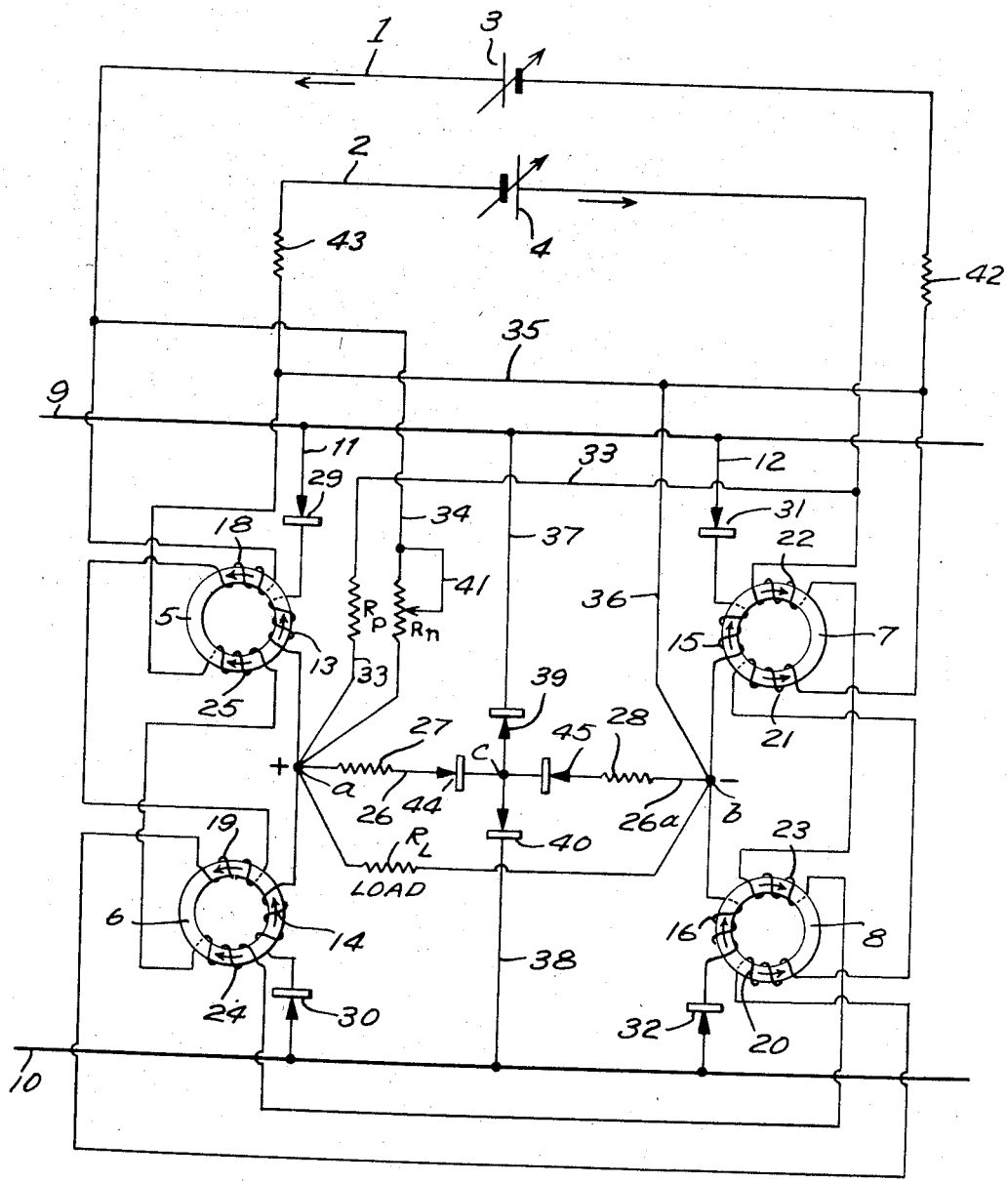
INVENTOR
MARVIN WEISS
BY
ATTORNEY United States Patent Office 2,866,016
Patented Dec. 23, 1958

2,866,016

SIGNAL COMPARATOR

Marvin Weiss, Bayside, N. Y., assignor to Sperry Rand Corporation, Ford Instrument Company Division, Long Island City, N. Y., a corporation of Delaware Application September 16, 1955, Serial No. 534,693

5 Claims. (Cl. 179—171)

This invention relates to a magnetic amplifier circuit having external feed-back and particularly to a magnetic amplifier whose output is a function of two input signals, the relative flux producing effects of which are partially controlled by a variable feed-back from the output.

The magnetic amplifier which is contemplated by the invention comprises a four-core push-pull circuit yielding a variable current in the output as a result of a controlled signal differential which is provided by a pair of independently energized signal circuits. The magnetic conditions in the cores are mutually established by the signals and feed-back currents which are combined therewith in the control windings. By means of a unique circuit arrangement the need for providing additional windings on the cores to carry the feed-back currents is eliminated.

Because the amplifier has two inputs, it is in effect an error sensing device, provision being made to make the output proportional to the error. The amplifier may serve as a signal comparator and be employed to sense the output of two transducers to indicate the difference in output or a function of the difference directly. The transducers might, for example, be employed to measure differences in pressure, flow, temperature or light intensity. The amplifier might also be employed with servo or recorder systems which respond to the difference between two quantities such as a standard quantity and a controlled variable.

An object of the invention is to provide an accurate and highly sensitive magnetic amplifier which is adapted to compare two signals and yield an output which is a linear function thereof.

Another object of the invention is to provide a variable feed-back current amplifier which employs the control windings to carry the feed-back currents derived from the output.

Another object is to provide a variable feed-back amplifier which is especially arranged to make efficient disposition of the control and feed-back currents.

Other objects and advantages of the invention may be appreciated on reading the following detailed description in connection with the accompanying figure which illustrates schematically the embodiment thereof.

According to the invention signal circuits 1 and 2 are provided to carry D. C. control currents of opposite polarities supplied as by batteries 3 and 4, respectively. The voltage sources are variable and might of course be any source of non-alternating current that is capable of supplying signals, at different levels.

The circuit employs four core reactors with two reactors on each side of the load. Each reactor core constitutes a closed magnetic circuit. Two pairs of reactors 5, 6 and 7 and 8, are connected in parallel across alternating current lines 9 and 10 by means of anode branch leads 11 and 12. A pair of anode windings 13 and 14 is connected in series in the lead 11. Similarly anode windings 15 and 16 are connected in series in the lead 12. The anode windings 13, 14, 15 and 16 are inductively related to the reactors 5, 6, and 7 and 8, respectively.

The control circuits are provided with windings which are similarly related to the reactors. Thus control windings 18, 19, 20 and 21 are series connected in the control circuit 1 being wound on reactors 5, 6, respectively, while in circuit 2 control windings 22, 23, 24 and 25 are in series connection being wound onto the cores of reactors 7 and 8, respectively.

Output leads 26 and 26a having split impedances 27 and 28, respectively, are connected from the anode branch leads 11 and 12 between the anode windings in each of these leads at points $a$ and $b$ to common point $c$. Half-wave rectifiers 44 and 45 are placed in the leads 26 and 26a respectively, to eliminate a circulating path for the control signals. Half-wave rectifiers 29 and 30 are provided in the lead 11 on each side of the load connection $a$ and are oppositely poled to permit the line current to flow in the direction of the connection. Similarly half-wave rectifiers 31 and 32 are provided in branch lead 12 on each side of the load connection $b$ and are similarly poled with respect to the load. A load resistance $R_L$ is also connected across the points $a$ and $b$ and the current through the load is unidirectional for a particular setting of the control currents. This is due to the fact that the anode windings are poled so that the controlled flux in the cores on the same side of the load bears the same directional relation to the control flux on both half-cycles.

A portion of the output is employed to control the input in the manner of external feed-back. Positive feedback connection 33 connects the branch lead 11 at point $a$ to control circuit 2 at a point on the right hand side of the load between control winding 22 and the voltage source 4. Negative feed-back connection 34 connects the branch lead 11 at a point $a$ to the control circuit 1 on the left hand side of the load between control winding 18 and the voltage source 3. The control circuits are bridged by a low resistance lead 35. A second low resistance lead 36 connects lead 35 to point $b$ in the load circuit. Return leads 37 and 38 provide return paths for the output currents by connecting the output leads 26 and 26a to lines 9 and 10, respectively. Half-wave rectifiers 39 and 40 are provided in the return leads 37 and 38, respectively, and are poled toward the alternating current lines whereby the currents through the output impedances 27 and 28 are unidirectional. It is thus seen that the control windings carry the signal currents and the feed-back currents thus affording space on the cores for additional control and anode turns, or bias turns.

The additional magnetization produced in the cores by the feed-back current is controlled by a fixed resistor $R_p$ and potentiometer $R_n$ in the positive and negative feedback circuits, respectively. The position of the tap 41 of the potentiometer $R_n$ is settable as a function of the input signal supplied by the voltage source 4. When this source voltage is increased the potentiometer tap is moved so as to place a lower impedance in the negative feedback circuit. The posititive feed-back current in circuit 2 then will have a smaller relative control action in the control windings in circuit 2 than before the voltage change and hence the magnetization effect in the cores as a result of the change in the voltage supply is substantially decreased.

Actually the amplifier will furnish an output with respect to the product of the signal error or input differential and the reciprocal of the signal supplied by the voltage source 4. The linearity between the output and input is made possible by the provision for variable feed-back which supplies the reciprocal quantity as a function of one of the signal levels. The feed-back potentiometer $R_n$ is settable in accordance with the signal furnished by the battery 4 and in effect computes the reciprocal thereof. The fixed resistor $R_p$ in the positive feed-back circuit furnishes a constant thereto which is determined by the required gain of the amplifier. It can be easily demonstrated that for an output linear with respect to the product of the signal error and the reciprocal of one of the signals the required feed-back transfer function, B may be expressed as follows:

$$B = \frac{1}{A} - \frac{N_0}{K}$$

Where A is equal to the amplifier gain, $N_0$ is equal to the signal from the battery 4 and K is a constant with dimensions. The feed-back function contains both positive and negative terms. The positive term $1/A$ is a constant determined by the gain of the amplifier and is determined by the resistor $R_p$. The negative term $$-\frac{N_0}{K}$$

depends on the $N_0$ signal level and is determined by the setting of the feed-back potentiometer $R_n$.

In order to prevent undue dissipation of feed-back current through the power sources, a high value resistor is inserted in each control circuit between the D. C. voltage sources and the lower resistance lead connections in the control circuits. A resistor 42 is provided in the control circuit 1 and a resistor 43 is placed in the control circuit 2. These resistors should be higher in value than the resistances of the control coils and may be as high as 100,000 ohms. The load resistance $R_L$ should be sufficiently high and may be 1000 ohms to eliminate a circulating path through the load.

It should be understood that modifications may be made in the magnetic amplifier circuit by one skilled in this art without departing from the principles and scope of the invention as defined in the following claims.

What is claimed is:

1. A magnetic amplifier comprising two pairs of closed magnetic circuits, a control circuit having a voltage source and a control winding inductively disposed on each magnetic circuit, a second control circuit having a voltage source and a control winding inductively disposed on each magnetic circuit, said voltage sources being arranged to supply oppositely directed currents in the corresponding control windings disposed on each magnetic circuit an alternating current line, a pair of branch leads connected across the line, each of said branch leads having an anode winding disposed on each magnetic circuit of one pair of said magnetic circuits, a load circuit disposed across said branch circuits and connected to the junction points of said anode windings in each branch circuit, a pair of half-wave rectifiers in each branch circuit, one rectifier being disposed on each side of the load circuit connections and poled in the direction of said connections, a return lead parallel to the branch circuits and connecting said output circuit to both sides of the line, half-wave rectifiers in said return lead disposed on each side of the output circuit connection and poled in the direction of the line, a low resistance lead connecting said control circuits, a positive feed back connection connecting one of said load circuit connections to one of said control circuits, a negative feed back connection connecting said one of the load circuit connections to the other of said control circuits, a variable potentiometer in one of said feed-back connections and a second low resistance lead connecting the first mentioned low resistance lead to the other of said load circuit connections, whereby said feed-back connections, control circuits including control windings, low resistance leads, load circuit and return lead comprise feed-back circuits to provide external feed-back control.

2. A magnetic amplifier as claimed in claim 1 wherein the variable potentiometer is placed in the negative feed-back connection and a fixed resistor is disposed in the positive feed-back connection.

3. A magnetic amplifier as claimed in claim 2 wherein the voltage sources in said control circuits are adapted to be variably controlled and said potentiometer is settable in accordance with the voltage supplied by one of said sources and the value of the fixed resistor is determined by the necessary amplifier gain.

4. A magnetic amplifier as claimed in claim 3 wherein high value resistors are disposed in said control circuits between said first mentioned low resistance lead and the variable voltage sources whereby the feed-back currents are prevented from circulating through the voltage sources in the control circuits.

5. A magnetic amplifier as claimed in claim 4 wherein a high value load resistance is placed in shunt connection with the output circuit and half-wave rectifiers poled in the direction of the return lead are provided in said output circuit whereby a circulating path for the signal currents through said load circuit is substantially eliminated.

References Cited in the file of this patent

UNITED STATES PATENTS

| | | |
|---|---|---|
| 2,584,856 | Fitzgerald | Feb. 5, 1952 |
| 2,700,130 | Geyger | Jan. 18, 1955 |
| 2,730,574 | Belsey | Jan. 10, 1956 |

OTHER REFERENCES

Geyger: "Magnetic Amplifier Circuits," McGraw-Hill Book Co., pub. January 29, 1954 (particularly chapter 9).